(12) United States Patent
Lai (10) Patent No.: US 7,133,918 B2
(45) Date of Patent: Nov. 7, 2006

(54) METHOD AND ELECTRONIC DEVICE ALLOWING AN HTML DOCUMENT TO ACCESS LOCAL SYSTEM RESOURCES

(75) Inventor: Chien-Chou Lai, Taoyuan County (TW)

(73) Assignee: High Tech Computer, Corp. (TW)

( * ) Notice: Subject to any disclaimer, the term of this patent is extended or adjusted under 35 U.S.C. 154(b) by 640 days.

(21) Appl. No.: 10/232,573

(22) Filed: Aug. 30, 2002

(65) Prior Publication Data

US 2003/0195971 A1 Oct. 16, 2003

(30) Foreign Application Priority Data

Apr. 15, 2002 (TW) ................ 91107674 A (51) Int. Cl.
*G06F 13/00* (2006.01)
(52) U.S. Cl. ............... 709/225; 709/219; 709/229
(58) Field of Classification Search ............. 709/217, 709/219, 225, 227, 229, 245; 719/330
See application file for complete search history.

(56) References Cited

U.S. PATENT DOCUMENTS

| | | | | |
|---|---|---|---|---|
| 5,999,941 | A * | 12/1999 | Andersen | 707/103 R |
| 6,212,153 | B1 * | 4/2001 | Chen et al. | 369/112.12 |
| 6,343,323 | B1 * | 1/2002 | Kalpio et al. | 709/229 |
| 6,460,079 | B1 * | 10/2002 | Blumenau | 709/223 |
| 6,549,773 | B1 * | 4/2003 | Linden et al. | 455/426.1 |
| 6,868,448 | B1 * | 3/2005 | Gupta et al. | 709/226 |
| 6,996,599 | B1 * | 2/2006 | Anders et al. | 709/201 |
| 2002/0116531 | A1 * | 8/2002 | Chu | 709/246 |
| 2003/0126271 | A1 * | 7/2003 | Mowry et al. | 709/230 |
| 2003/0208570 | A1 * | 11/2003 | Lapidous | 709/222 |

\* cited by examiner

*Primary Examiner*—Viet D. Vu
(74) *Attorney, Agent, or Firm*—Martine Penilla & Gencarella, LLP (57) ABSTRACT

A method for an HTML document to access local system resources, which receives an HTTP request and judges whether the HTTP request includes a predetermined keyword. A system-resource-accessing portion of the HTTP request is processed when the HTTP request includes the predetermined keyword. Then, the HTTP request is checked whether it contains a Referer field. If the header of the HTTP request includes the Referer field, the HTTP request will be treated as an external request, and the local system resource accessing will be denied even when the HTTP request includes the predetermined keyword.

29 Claims, 5 Drawing Sheets

```
<HTML>
<BODY onload="parent.pss_rc()">
<div id="_pss_rc_" style="visibility:hidden">
<! -- return data -->
<p id="_pss_rc_1">data1</p>
<p id="_pss_rc_2">data2</p>
<! -- return data -->
</div>
</BODY>
</HTML>
```

FIG. 4

```
<HTML>
<head>
<script>
function pss_rc()
{
    //Process return result here

//Return to original web page
    window.history.go(-1);
}
</script>
</head>
<FRAMESET border=0>
<FRAME src="ClkMusic.htm" name="_PSS_" marginHeight=0 marginWidth=0 noResize scrolling="no">
</FRAMESET>
</HTML>
```

METHOD AND ELECTRONIC DEVICE ALLOWING AN HTML DOCUMENT TO ACCESS LOCAL SYSTEM RESOURCES

BACKGROUND OF THE INVENTION

1. Field of the Invention

The invention relates to a method and an electronic device that allows an HTML document to access local system resources, and an HTML document that is able to access local system resources.

2. Description of the Related Art

Hypertext markup language (HTML) is used on the World Wide Web (WWW). In a web document, HTML utilizes tags to define the page layout, fonts and graphic elements, so that a web browser knows how to display a web document to a user. HTML also utilizes tags or codes to inform a web browser how to response to a user's actions. For example, HTML provides hypertext links to other documents on the Web. Each link contains a uniform resource locator (URL), or address, of a Web page residing on the same server or any server worldwide. When a user clicks the hypertext link on an HTML document, the browser links to another web page or document as specified in the hypertext link.

Along with the developments of computer and network technologies, HTML documents are no more than static documents. Utilizing DHTML (dynamic HTML) and applets, HTML documents are able to interactive with the users or to create various dynamic effects. For instance, a DHTML document can provide a text box. A user can type text in the text box, and click a button, which is also provided by the DHTML document, to send the text to a remote server.

However, for security concerns, HTML documents are not authorized to access local system resources. For example, to protect the data stored in a local computer from being destroyed, an HTML document downloaded form a remote computer is not allowed to access data stored in the local computer.

To further enhance the capability of an HTML document and the services provided by a WWW server, nowadays an HTML document can access local system resources through a certified ActiveX control object. An ActiveX control object can be embedded in an HTML document. After requesting the user to trust the certificate issued to the ActiveX control object, the HTML document can access local system resources to store data temporarily in a local computer for later accessing or to install a program in the local computer through the ActiveX control object.

Although the ActiveX technology allows an HTML document to access local system resources, it still has disadvantages. For example, an ActiveX control object requires an additional certification procedure, which is inconvenient to both the user and the HTML document drafter and designer. Moreover, since an ActiveX control object operates independently after being downloaded to a local computer, it would never act like an application program interface (API) layer for the HTML document. Therefore, it is hard for an ActiveX control object to have the capability to cross platform.

SUMMARY OF THE INVENTION

In view of the above, an object of the invention is to provide a method and an electronic device that allow an HTML document to access local system resources using standard HTML.

Another object of the invention is to provide a method and an electronic device that allow an HTML document to access local system resources while having the capability to cross platform.

Still another object of the invention is to provide a method and an electronic device that allow an HTML document to access local system resources and can omit the procedure of user confirmation while ensuring the security of local system resource accessing.

To achieve the above-mention objects, the method according to the invention receives an HTTP request, and judges whether the HTTP request includes a predetermined keyword. A system-resource-accessing portion of the HTTP request is processed when the HTTP request includes the predetermined keyword. The HTTP request is passed when it does not include the predetermined keyword.

The predetermined keyword may be hidden in the standard HTTP protocol. The invention uses a format compatible with the standard HTTP protocol to inform a proxy that the HTTP request is an HTTP request that requests for local system resource accessing.

In an embodiment, the method may further checks whether the HTTP request is an external request. When the request is an external request, the method according to the invention can deny the HTTP request to access local system resources. An HTTP request may be determined as an external request if its header includes a "Referer" field.

Except for denying an external HTML document to access local system resources, the method according to another embodiment of the invention may allow the HTML document downloaded from a specific server to access local system resources by filtering the Referer field of the HTTP requests. Commercial websites can provide their customers more secure services using this mechanism.

In still another embodiment of the invention, a return code page (RCP) can be returned to the HTML document calling the system-resource-accessing service, so that the HTML document can receive and process the return value of the system-resource-accessing service. The HTML document may incorporate an RCP processing function to process the RCP.

The invention also discloses an electronic device to implement the above-mentioned method. The electronic device includes a proxy and an intermediate layer. The proxy receives the HTTP request and judges whether the HTTP request includes the predetermined keyword. The intermediate layer processes the system-resource-accessing portion of the HTTP request when the HTTP request includes the predetermined keyword.

According to the invention, the drafter or the designer of an HTML document can use standard HTML to access local system resources. Furthermore, since HTTP is a standard protocol, the drafter or the designer of an HTML document does not have to consider the cross-platform issue. According to the invention, an HTML document can access local system resources over various operating systems. Moreover, while ensuring security, the method according to the invention does not need an additional certification procedure as the Active control object when accessing local system resources. Therefore, the method of the invention has advantages both on security control and convenient usage.

DETAILED DESCRIPTION OF THE PREFERRED EMBODIMENTS

The method according to an embodiment of the invention will be described with reference to the accompanying drawings, wherein the same reference numbers denote the same elements.

In an embodiment of the invention, the method allowing an HTML document to access local system resources is implemented in a computer. This computer can include at least one input device, at least one output device, at least one storage device and at least one microprocessor. The input device may be, for example, a keyboard, a mouse, a digital tablet or a trackball that can receive a user's input. The output device may be a CRT display, an LCD panel or a plasma display that can display text, graphic or any kind of information to the user.

The storage device may be any kind of computer-readable storage device, such as a DRAM, a ROM, an EEPROM, a floppy disc drive, a hard disc drive or a CD-ROM drive. The microprocessor may be any kind of architecture. For example, the microprocessor may include an arithmetic logic unit (ALU) for performing arithmetical and logical calculations, registers to store data or instructions temporarily, and a control unit to control various operations of the computer. Furthermore, the computer may include a network interface, such as a modem or a network adapter, for transmitting various kinds of requests, responses, signals or data via a communication network.

Figure 1:
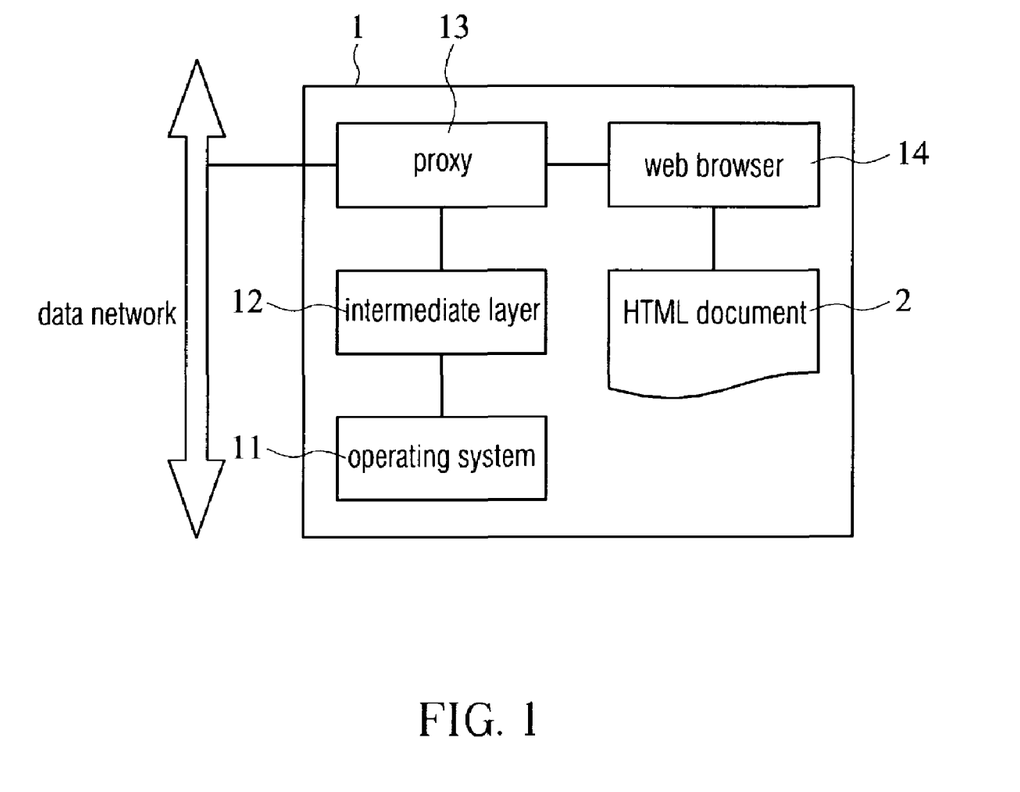
FIG. 1 is a block diagram showing the architecture of a computer that allows an HTML document to access local system resources.

Referring to FIG. 1, the computer 1 is installed with an operating system 11, an intermediate layer 12, a proxy 13 and a web browser 14. Under ordinary circumstances, a proxy acts like an agent between the local computer and a server. The proxy routes the HTTP requests sent from the local computer to the server, and routes the responses sent from the server to the local computer. Presently most web browsers support this proxy mechanism. Users can send and receive HTTP requests through a proxy by enabling the proxy mechanism of the web browsers.

In the present embodiment, the proxy 13 performs a pre-processing to any HTTP request generated by the web browser 14. When an HTTP request is generated, the proxy 13 receives this HTTP request, and examines the HTTP request to see if its header includes a predetermined keyword. When the header of the HTTP request includes the predetermined keyword, the proxy 13 sends the HTTP request to the intermediate layer 12. The intermediate layer 12 then processes the portion of the HTTP request that requests for accessing local system resources, and calls the operating system 11 to access the local system resources.

When a web designer wants an HTML document to have the ability of accessing local system resources, he or she can insert the predetermined keyword in the HTML document to invoke the proxy 13 to call the intermediate layer 12. The predetermined keyword can be in any form. For example, the predetermined keyword may be a specific domain name "SPP.PSS", which means "System Probe Proxy" and "Proxy System Services". When an HTTP request includes this specific domain name "SPP.PSS", the proxy 13 initiates the system-resource-accessing service. When an HTTP request does not include this specific domain name, the system-resource-accessing service is not initiated, and the proxy 13 passes the HTTP request directly.

The predetermined keyword can be hidden in the standard HTTP protocol. The URL scheme of the standard HTTP protocol is:

http_URL="http:" "//" host [abs_path]

The present embodiment utilizes the same format as the URL scheme of the standard HTTP protocol to inform the proxy 13 that the HTTP request is a request which requests for accessing local system resources:

http_URL="http:" "//" "predetermined keyword" "//" specific name of the local system resource"

Figure 2:
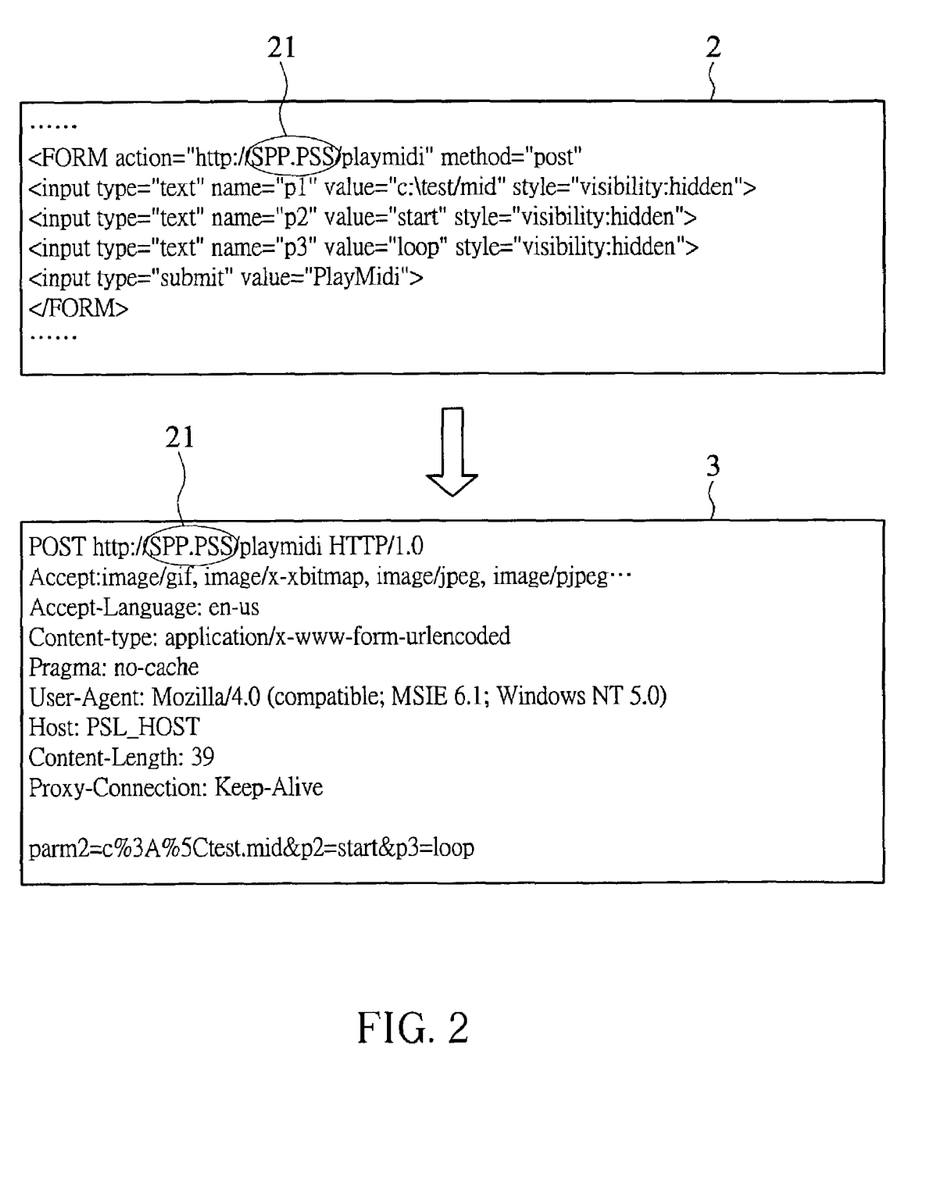
FIG. 2 is a schematic diagram showing an HTML document and its header including a predetermined keyword according to an embodiment of the invention.

For example, when an HTML document 2 includes contents as shown in FIG. 2, the web browser 14 generates a "PlayMidi" button on the screen. If a user moves the cursor to click the button on the screen, the web browser 14 then generates an HTTP request. Since the "action" attribute of the "FORM" tag contains the predetermined keyword "SPP.PSS", the header 3 of the HTTP request also contains the predetermined keyword "SPP.PSS".

After receiving the HTTP request, the proxy 13 parses the content of the header 3. Since the header 3 includes the predetermined keyword "SPP.PSS", the system-resource-accessing service of the proxy 13 is initiated. Then, the proxy 13 checks whether the HTTP request is an external request.

When an HTTP request is generated, the header of the HTTP request records a uniform resource identifier (URI) in the "Referer" field if the source of the HTTP request has its own URI. URI is a string including a uniform resource name (URN) and a uniform resource locator (URL) to identify, for example, the location and type of a file. If the HTML document that includes the hyperlink for generating the HTTP request is stored in the storage device of the computer 1, then the "Referer" field does not exist in the header of the HTTP request.

Therefore, in the present embodiment, the proxy 13 can judge whether the HTTP request is from the local computer or from an external source. That is, the proxy 13 can judge whether the HTML document including the hyperlink for generating the HTTP request is originally stored in the local computer or is downloaded from a remote server, by checking whether the "Referer" field exists in the header. If the HTTP request is from the local computer, i.e., the HTML document including the hyperlink for generating the HTTP request is originally stored in the local computer, then the HTTP request is allowed to access local system resources. In the example shown in FIG. 2, since the header 3 does not include a "Referer" field, the HTTP request 21 is allowed to access the file "test.mid".

It should be noted that except for denying external HTML document to access system resources, the proxy 13 might allow HTML documents downloaded from a specific server to access local system resources by filtering the HTTP requests. If the "Referer" field contains a specific address of the specific server, the local system resource accessing is not prohibited. Commercial websites can provide their customers more secure services using this mechanism.

Figure 3:
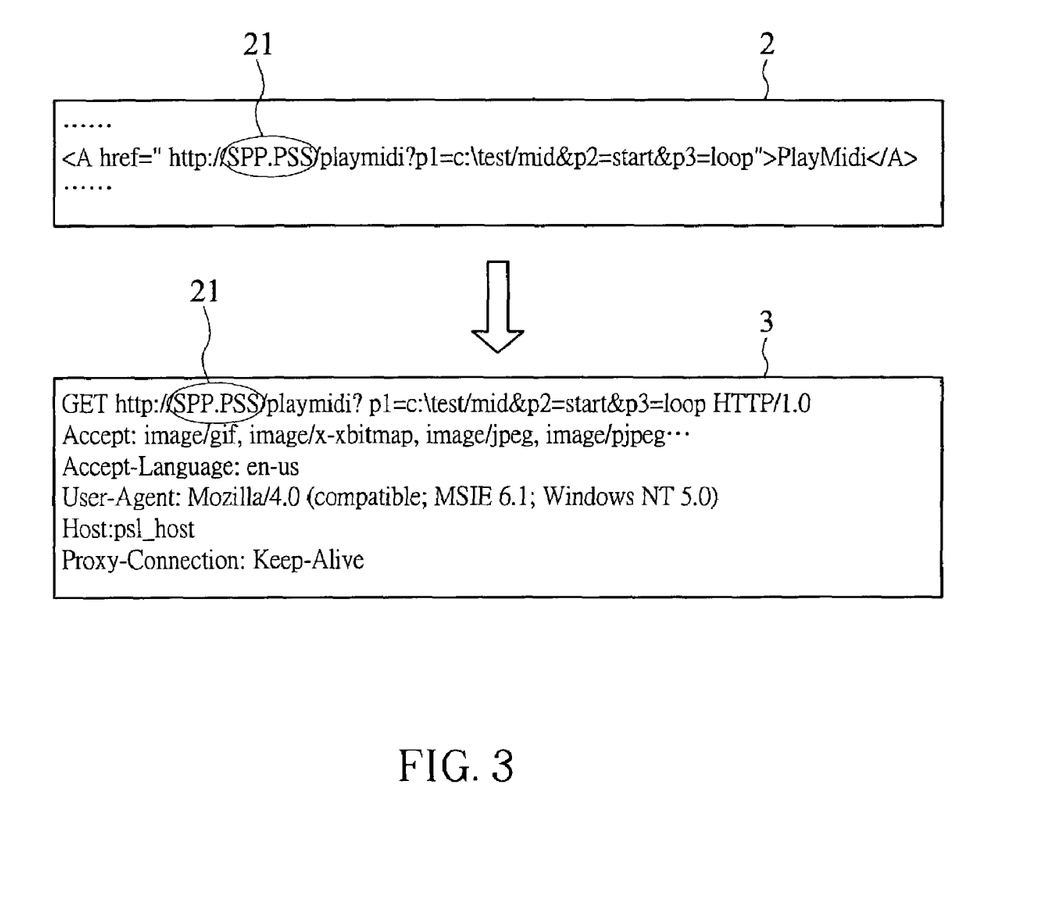
FIG. 3 is a schematic diagram showing an HTML document and its header including a predetermined keyword according to another embodiment of the invention.

Referring to FIG. 3, in another embodiment, the HTML document 2 includes a standard "A" tag to generate a hyperlink on the screen that accesses local system resources. After being clicked, the web browser 14 generates an HTTP request with a header 3 as shown in FIG. 3. As described above, after receiving the HTTP request, the proxy 13 checks whether the HTTP request includes the predetermined keyword, and whether it is allowed to access local system resources.

Figure 4:
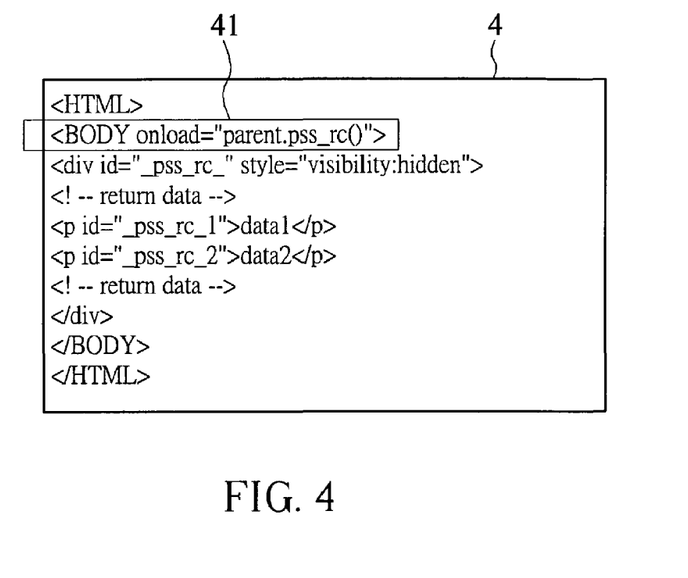
FIG. 4 is a schematic diagram showing an example of an RCP.

FIG. 4 is an example of a return code page (RCP) 4. In another embodiment, except for processing received data, the proxy 13 also returns a result of the local system resource accessing to the HTML document so that the HTML document can acknowledge and process the result. One way is to make the proxy 13 to generate an RCP, and returns the RCP to the web browser 14. In the RCP, a DHTML event handler 41 can be included to call an RCP processing function defined in its parent object. The RCP processing function will be described later.

Since the RCP is another web page, the HTML document may not become the activating web page after accessing local system resources. To solve this, the HTML document can be embedded in another main web page.

Figure 5:
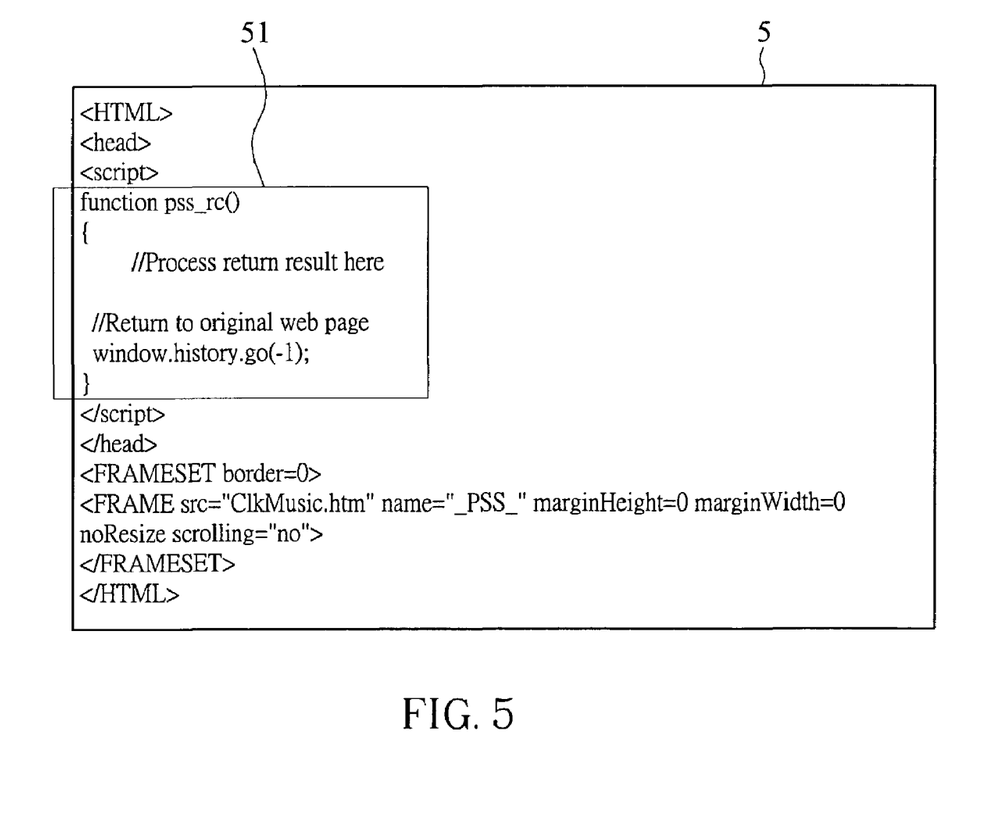
FIG. 5 is a schematic diagram showing an example of a main web page.

FIG. 5 shows an example of a main web page 5. The main web page 5 is embedded with a web page "ClkMusic.htm" that includes the predetermined keyword 21. While processing the returned result, the RCP can include the event handler 41 as shown in FIG. 4, i.e., the description "<BODY onload="parent.pss_rc( )">", to inform the web browser 14 to call the RCP processing function 51 pre-defined in the parent object after loading the RCP. The RCP processing function 51 may be a JavaScript or VBScript applet, and its content can be determined according to the practical needs by the person skilled in the art. For example, the RCP processing function 51 can instruct the web browser 14 to close the RCP and return to the main web page 5. In this way, the main web page 5 will become the activating web page, and users can continue to browse the content of the main web page 5.

Figure 6:
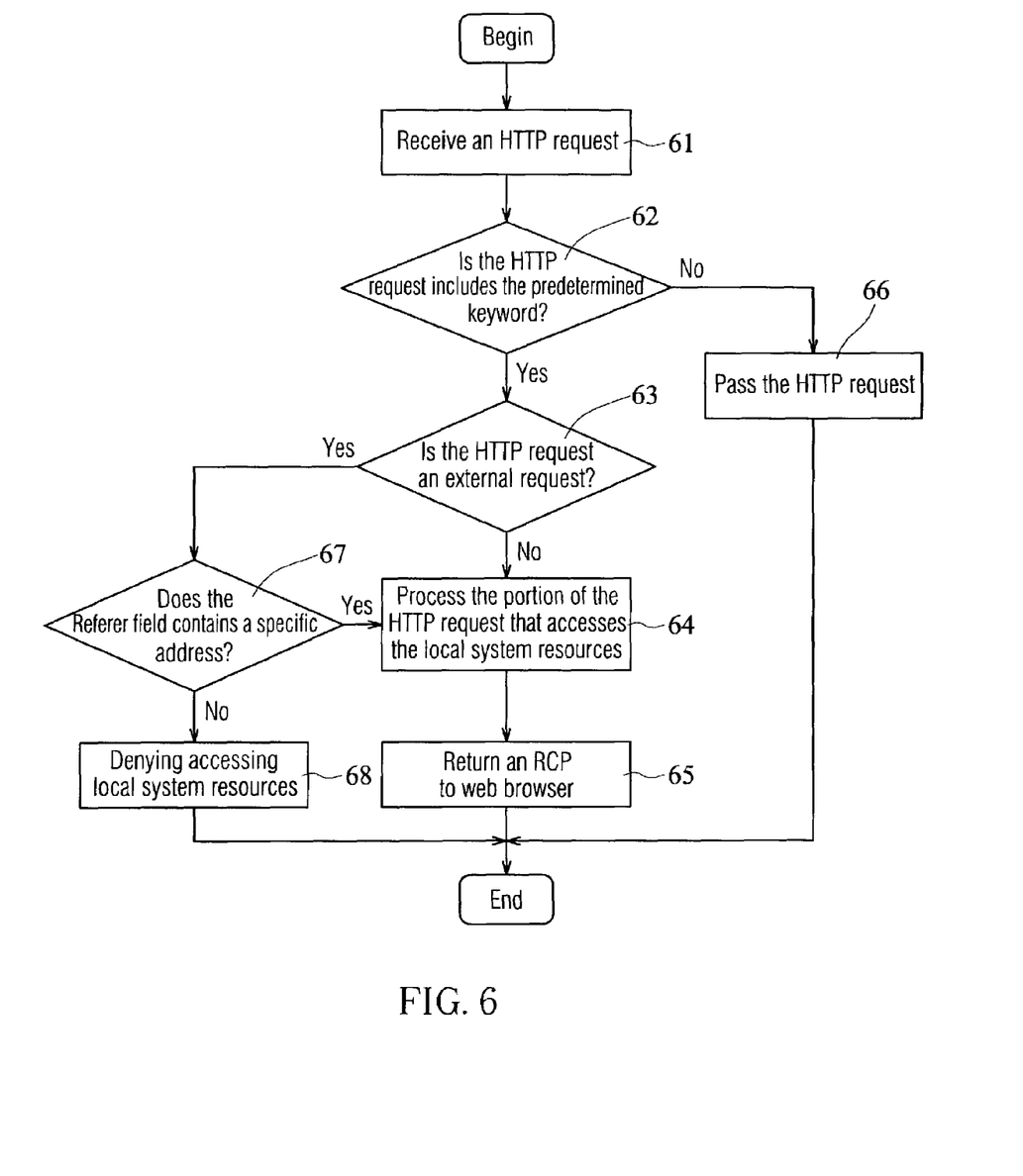
FIG. 6 is a flowchart showing the procedure of HTTP request processing according to an embodiment of the invention.

FIG. 6 shows the procedure of the proxy 13 and the intermediate layer 12 processing an HTTP request. Referring to FIG. 6, when an HTTP request is generated, the proxy 13 receives the HTTP request (step 61), and checks whether the HTTP request includes a predetermined keyword (step 62). If the HTTP request does not include the predetermined keyword, then the proxy 13 passes the HTTP request (step 66) so that the HTTP request can reach its destination, such as to reach a remote server via a packet-switch network.

If the HTTP request includes the predetermined keyword, then the proxy 13 further judges if the HTTP request is an external request (step 63). As described previously, one way is to check whether the header of the HTTP request includes a "Referer" field. If the header includes the "Referer" field, then it can be determined that the HTTP request is an external request, i.e., the HTML document including the hyperlink for generating the HTTP request is downloaded from a remote server. At this time, the proxy 13 further checks whether the "Referer" field contains a specific address (step 67). If the "Referer" field does not contain a specific address, then the proxy 13 denies the request of the HTTP request to access local system resources based on security concern (step 68).

If the HTTP request is not an external request, and is generated from an HTML document stored in the local computer, or from an HTML document downloaded from a specific server, then the proxy 13 sends the portion of the HTTP request that accesses the local system resources to the intermediate layer 12. After receiving the portion of the HTTP request that accesses the local system resources of a string type, the intermediate layer 12 calls the operating system 11 to access the corresponding system resource, and return the result to the proxy 13 (step 64). The proxy 13 returns an RCP to web browser 14 (step 65) as the returned value of the local system resource accessing.

According to the invention, the drafter or the designer of an HTML document can use standard HTML to access local system resources. This facilitates the usage of the local system resources.

Furthermore, since HTTP is a standard protocol, the drafter or the designer of an HTML document does not have to consider the cross-platform issue. According to the invention, an HTML document can access local system resources over various operating systems.

Moreover, while ensuring security, the method according to the invention does not need an additional certification procedure as the Active control object when accessing local system resources. Therefore, the method of the invention has advantages both on security control and convenient usage.

While the invention has been described by way of examples and in terms of embodiments, it is to be understood that the invention is not limited to the disclosed embodiments. To the contrary, it is intended to cover various modifications.

For example, the proxy and the intermediate layer can be installed in a personal digital assistant (PDA) to handle the portion of the HTTP request that accesses the system resource of the PDA.

Furthermore, the web browser and the proxy do not necessarily be installed in the same electronic device. The web browser and the proxy can be installed in different electronic devices so that the HTML document in one device can use the system resource of another device installed with the proxy.

Therefore, the scope of the appended claims should be accorded the broadest interpretation so as to encompass all such modifications.

What is claimed is:

1. A method for an HTML document to access local system resources, comprising:
   receiving a hypertext transfer protocol (HTTP) request;
   checking whether the HTTP request is an external request;
   denying the HTTP request to access local system resources when the request is an external request;
   judging whether the HTTP request includes a predetermined keyword;
   processing a system-resource-accessing portion of the HTTP request when the HTTP request includes the predetermined keyword; and
   passing the HTTP request to its destination when the HTTP request does not include the predetermined keyword.

2. The method according to claim 1, wherein the judging is accomplished by checking whether the header of the HTTP request includes the predetermined keyword.

3. The method according to claim 1, wherein the checking is accomplished by checking whether the header of the HTTP request includes a Referer field.

4. The method according to claim 1, wherein the predetermined keyword is a predetermined domain name.

5. The method according to claim 1, further comprising:
   returning a return code page (RCP) after the processing step.

6. An electronic device allowing an HTML document to access local system resources, comprising:
a proxy for receiving an HTTP request, checking whether the HTTP request is an external request, and judging whether the HTTP request includes a predetermined keyword, wherein the proxy denies the HTTP request to access local system resources when the request is an external request and passes the HTTP request to its destination when the HTTP request does not include the predetermined word; and
an intermediate layer for processing a system-resource-accessing portion of the HTTP request when the HTTP request includes the predetermined keyword.

7. The electronic device according to claim 6, further comprising:
an operating system for responding a call from the intermediate layer when processing the system-resource-accessing portion of the HTTP request.

8. The electronic device according to claim 6, further comprising:
a web browser for generating the HTTP request.

9. The electronic device according to claim 6, wherein the proxy examines the header of the HTTP request while judging whether the HTTP request includes the predetermined keyword.

10. The electronic device according to claim 6, wherein the proxy checks whether the header of the HTTP request includes a Referer field while checking whether the HTTP request is an external request.

11. The electronic device according to claim 6, wherein the proxy further returns a return code page (RCP) after the system-resource-accessing portion of the HTTP request being processed by the intermediate layer.

12. A computer-readable storage medium having instructions recorded thereon for a computer to perform the following steps:
receiving an HTTP request;
checking whether the HTTP request is an external request;
denying the HTTP request to access local system resources when the request is an external request;
judging whether the HTTP request includes a predetermined keyword;
processing a system-resource-accessing portion of the HTTP request when the HTTP request includes the predetermined keyword; and
passing the HTTP request to its destination when the HTTP request does not include the predetermined keyword.

13. The computer-readable storage medium according to claim 12, wherein the judging is accomplished by checking whether the header of the HTTP request includes the predetermined keyword.

14. The computer-readable storage medium according to claim 12, wherein the checking is accomplished by checking whether the header of the HTTP request includes a Referer field.

15. The computer-readable storage medium according to claim 12, wherein the instructions further enable the computer to perform the following step:
returning a return code page (RCP) after the processing step.

16. The computer-readable storage medium according to claim 12, wherein the predetermined keyword is a predetermined domain name.

17. A method for an HTML document to access local system resources, comprising:
receiving a hypertext transfer protocol (HTTP) request;
checking whether the header of the HTTP request includes a Referer field;
denying the HTTP request to access local system resources when the HTTP request includes a Referer field and the Referer field does not contain a specific address;
judging whether the HTTP request includes a predetermined keyword;
processing a system-resource-accessing portion of the HTTP request when the HTTP request includes the predetermined keyword; and
passing the HTTP request to its destination when the HTTP request does not include the predetermined keyword.

18. The method according to claim 17, wherein the judging is accomplished by checking whether the header of the HTTP request includes the predetermined keyword.

19. The method according to claim 17, wherein the predetermined keyword is a predetermined domain name.

20. The method according to claim 17, further comprising:
returning a return code page (RCP) after the processing step.

21. An electronic device allowing an HTML document to access local system resources, comprising:
a proxy for receiving an HTTP request, checking whether the header of the HTTP request includes a Referer field, and judging whether the HTTP request includes a predetermined keyword, wherein the proxy denies the HTTP request to access local system resources when the HTTP request includes a Referer field and the Referer field does not contain a specific address and, passes the HTTP request to its destination when the HTTP request does not include the predetermined word; and
an intermediate layer for processing a system-resource-accessing portion of the HTTP request when the HTTP request includes the predetermined keyword.

22. The electronic device according to claim 21, further comprising:
an operating system for responding a call from the intermediate layer when processing the system-resource-accessing portion of the HTTP request.

23. The electronic device according to claim 21, further comprising:
a web browser for generating the HTTP request.

24. The electronic device according to claim 21, wherein the proxy examines the header of the HTTP request while judging whether the HTTP request includes the predetermined keyword.

25. The electronic device according to claim 21, wherein the proxy further returns a return code page (RCP) after the system-resource-accessing portion of the HTTP request being processed by the intermediate layer.

26. A computer-readable storage medium having instructions recorded thereon for a computer to perform the following steps:
receiving an HTTP request;
checking whether the HTTP request includes a Referer field;
denying the HTTP request to access local system resources when the HTTP request includes a Referer field and the Referer field does not contain a specific address;
judging whether the HTTP request includes a predetermined keyword;

processing a system-resource-accessing portion of the HTTP request when the HTTP request includes the predetermined keyword; and passing the HTTP request to its destination when the HTTP request does not include the predetermined keyword.

27. The computer-readable storage medium according to claim 26, wherein the judging is accomplished by checking whether the header of the HTTP request includes the predetermined keyword.

28. The computer-readable storage medium according to claim 26, wherein the instructions further enable the computer to perform the following step:

returning a return code page (RCP) after the processing step.

29. The computer-readable storage medium according to claim 26, wherein the predetermined keyword is a predetermined domain name.

* * * * *